Oct. 13, 1942.  E. C. SLOAN ET AL  2,298,980
FILTER AND METHOD OF PRODUCING SAME
Filed Aug. 30, 1940  4 Sheets-Sheet 1

INVENTORS.
Edward C. Sloan
and Augustus H. Eberman,
By Parkinson + Lane,
ATTORNEYS.

Witness:
Chas. L. Koursh

Oct. 13, 1942.  E. C. SLOAN ET AL  2,298,980
FILTER AND METHOD OF PRODUCING SAME
Filed Aug. 30, 1940  4 Sheets-Sheet 2
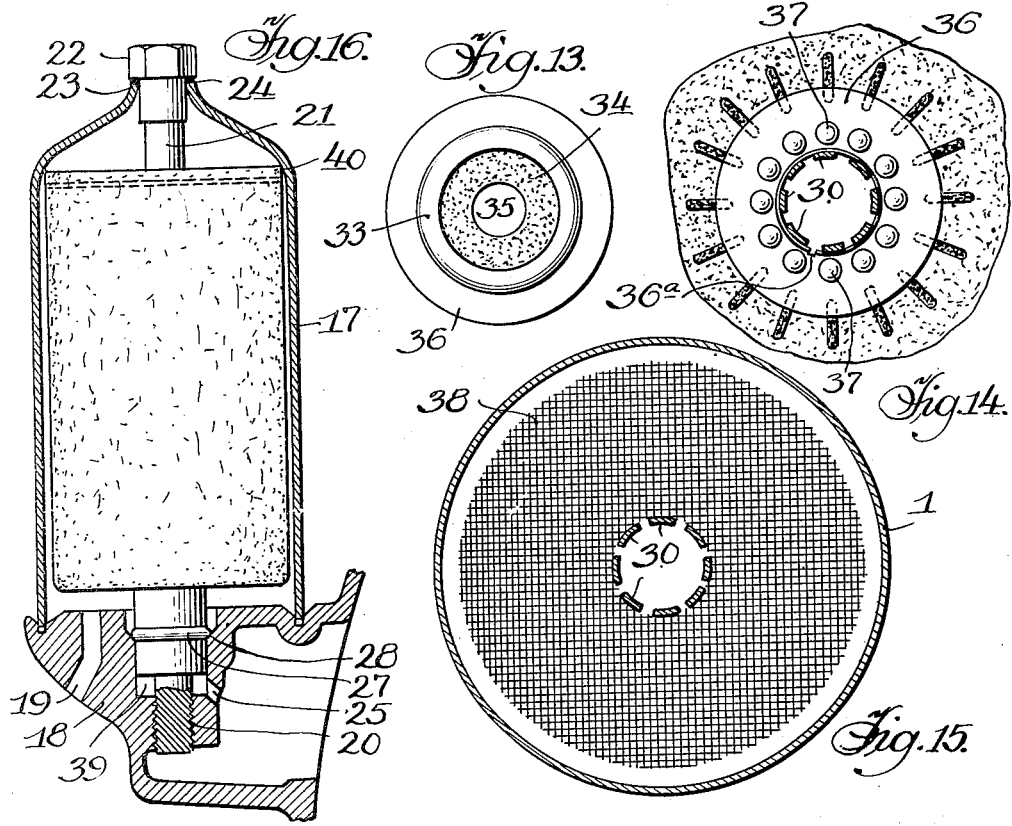
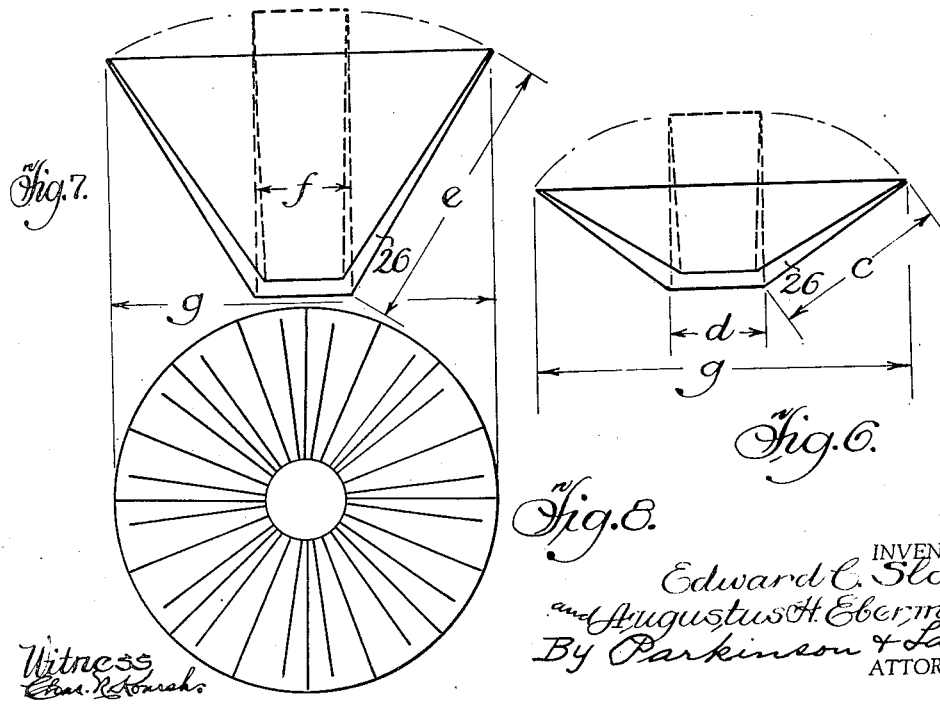
INVENTORS
Edward C. Sloan,
and Augustus H. Eberman,
By Parkinson + Lane,
ATTORNEYS.

Oct. 13, 1942.  E. C. SLOAN ET AL  2,298,980
FILTER AND METHOD OF PRODUCING SAME
Filed Aug. 30, 1940  4 Sheets-Sheet 3

INVENTORS.
Edward C. Sloan
and Augustus H. Eberman,
By Parkinson & Lane,
ATTORNEYS Witness:
Chas. R. Koursh Oct. 13, 1942.   E. C. SLOAN ET AL   2,298,980
FILTER AND METHOD OF PRODUCING SAME
Filed Aug. 30, 1940   4 Sheets-Sheet 4
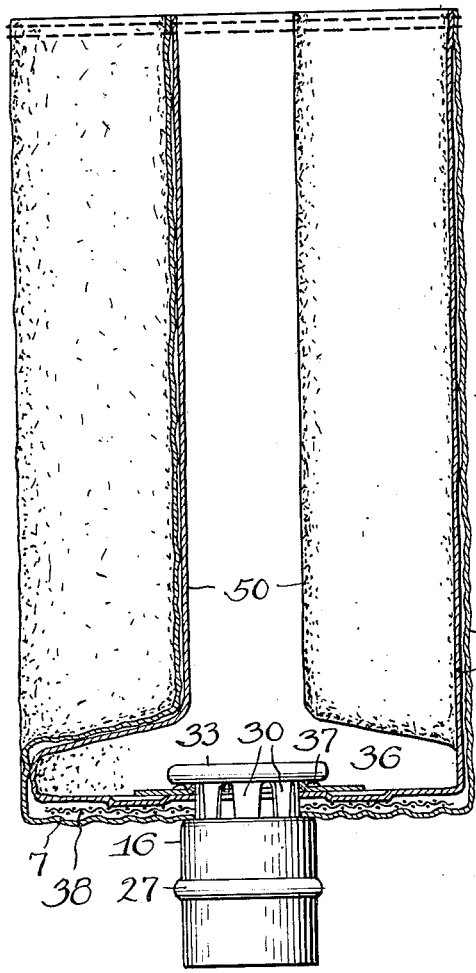
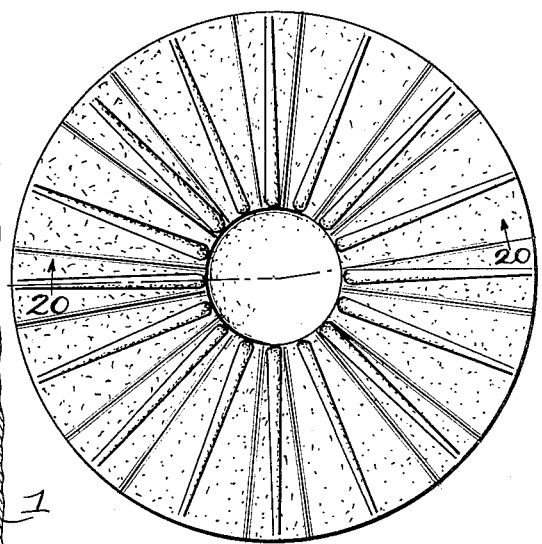
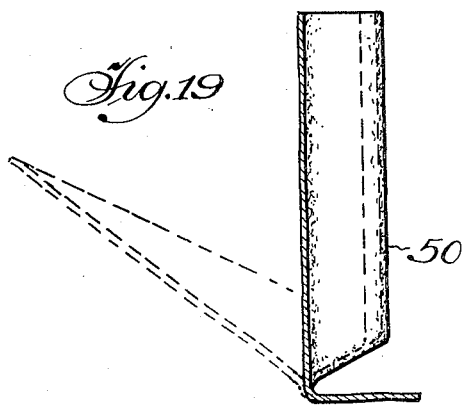
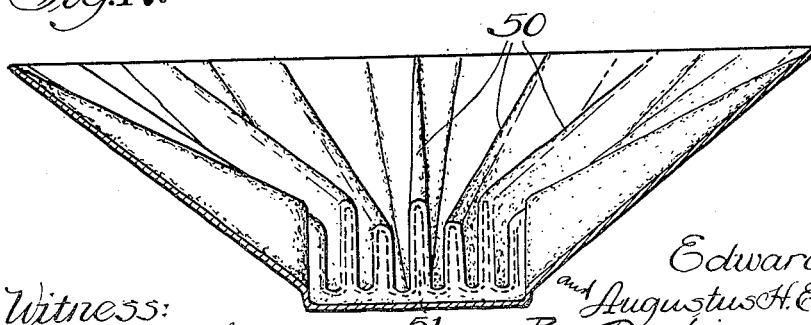
INVENTORS.
Edward C. Sloan,
and Augustus H. Eberman,
By Parkinson + Lane,
ATTORNEYS.

Patented Oct. 13, 1942

2,298,980

UNITED STATES PATENT OFFICE 2,298,980

FILTER AND METHOD OF PRODUCING SAME

Edward C. Sloan and Augustus H. Eberman, Geneva, Ill., assignors to Jesse B. Hawley, Geneva, Ill.

Application August 30, 1940, Serial No. 354,808

14 Claims. (Cl. 210—204)

This invention relates to filters and the method of producing the same and more particularly to filters made of fibrous materials accreted and so constructed as to enable control of the amount of filtering area of the filters.

While we do not wish to limit our invention thereto, our filters are especially adapted for filtering oil and the like, and while we will in the following description describe our filters preferably in connection with the filtering of oil and the like, we wish it understood that they may be used for filtering such other fluids that they may be adapted for. In the use of oil and the like for lubricating internal combustion engines and similar machines, it is of prime importance to filter the dirt out of the oil to keep the oil in good lubricating condition and prevent wear and abrasion of the moving parts. In automotive vehicles and the like it has been customary to provide filters in the oil circulating system to remove at least a portion of the dirt and foreign matter from the circulating oil. Such filters as heretofore known, however, have been objectionable in that they have not adequately removed the dirt and foreign matter, or have not been of sufficiently long life, or have not been of sufficiently extensive area in the necessarily small space they must occupy, or have not been of the proper construction to give the desired results, or have not been economical either in efficiency or length of service.

Among the objects of the present invention is to provide a filter that will overcome the above objections and enable the handling and forming of fibrous material by accreting the same into desired contour, which contour may or may not require bending, folding or further manipulation to bring the filter into its final form.

A further object is to accrete into semi-final form a fibrous blank of desired angular shape, and subsequently folding the same to bring its marginal portions into a plurality of folds to give increased filtering area and at the same time enable it to be enclosed in a small diameter casing.

Another object is to form by accretion in a fibrous pulp bath a pair of porous fibrous blanks, each accreted separately and each having its sides of desired angular shape, placing one of said blanks within the other, fastening the marginal edges together, and folding them to bring the marginal portions into a considerable number of folds to give increased filtering area, and yet be enclosed in a small diameter casing.

A still further object is to so construct the wall members of an accreted fibrous filter that when folded into shape to be placed within a cylindrical casing the marginal portions will be folded a considerable number of times to give increased filtering area without undue crowding of the folds.

Another object is to control the extent of folded area in a fibrous filter by controlling the angularity of the side wall with relation to the diameter of the blank and the finished length of the filter.

A further object is to so arrange the fold lines as to give greater filtering efficiency.

An additional object is to provide a plurality of filtering surfaces of such roughened formation as to enable said surfaces to contact each other back to back without separate reinforcing elements and yet make possible the flow of the filtered fluid along or through the spaces provided between the meeting projections of the back to back walls.

Another object is to accrete on a pair of separate formers in a fibrous bath a pair of separate blanks each having hollow ribs, the ribs of one blank to fit within those of the other, the angle of the side walls of one blank being less than that of the other, the construction being such that when the free edges of the blanks are secured together and the connected blanks folded and their sides brought to a substantially vertical position to be placed within a filter casing, the said sides will have folds and ribs of substantial width extending nearly the full height of the filter member to give increased filtering area without undue crowding of the folds.

A further object is to provide a novel method for producing the filter of the present invention.

A still further object is to provide a double walled fibrous filter with inwardly extending folds to form hollow ribs, the alternate ribs extending inwardly a less distance than the others to give full filtering area without crowding of the ribs with relation to each other.

Another object is to provide a novel fibrous filter element, economical in manufacture, efficient in operation, giving increased filtering area within a small filter casing diameter, and having a longer life per unit volume of fluid filtered.

Other objects, advantages and capabilities will later more fully appear.

Our invention further resides in the combination, construction and arrangement of parts illustrated in the accompanying drawings, and while we have shown therein preferred embodiments, we wish it understood that the same are susceptible of modification and change without departing from the spirit of our invention.

In the drawings:

Fig. 6 is a diagrammatic vertical transverse section similar to Fig. 5 but showing the side walls of the inner and outer shells formed at greater angles with relation to the horizontal to produce, with the same overall diameter, a greater extent of filtering area with the same amount of folded perimeter when the sides are folded upwardly to the position shown in the dotted lines.

Fig. 7 is a diagrammatic vertical transverse section similar to Fig. 6 but showing the side walls formed at even greater angles with relation to the horizontal to enable the use of shells of greater filtering area without excessive crowding of the folds when the sides are folded upwardly to upright position of greater height than any of the preceding views.

Fig. 8 is a top plan view of Fig. 7.

Fig. 13 is a fragmentary plan view looking down from a plane through the line 13—13 in Fig. 10.

Fig. 14 is a fragmentary horizontal section on the line 14—14 of Fig. 10.

Fig. 15 is a horizontal section on the line 15—15 of Fig. 10.

Fig. 16 is a vertical longitudinal section of the filter case showing the filter element in elevation.

Fig. 17 is a vertical transverse section of a modified form of filter blank to give increased filtering area.

Fig. 18 is a top plan view of a complete blank of the form shown in Fig. 17.

Fig. 19 is a fragmentary sectional view of a portion of the blank shown in Figs. 17 and 18, the dotted lines showing the same prior to bending upwardly and the solid lines showing the same after being bent into upright position.

Fig. 20 is a vertical longitudinal section on the line 20—20 of Fig. 18 and showing the outlet tube connected to the folded blank, the parts being ready to be inserted into the filter casing shown in Fig. 16.

It will be understood that if a flat disc of fibrous material which is to be folded upwardly along a concentric circular line forming a base, that the perimeter and the portion extending from the perimeter downwardly toward the base will have folds formed therein because of the diameter of the top after the folding takes place being considerably smaller than the diameter of the disc before folding. When such folding is effected with a flat disc of an overall diameter to give the necessary filtering area, the folded portions will be so excessive as to cause undue crowding together of the folds at and near the perimeter. If, however, a blank is accreted onto a porous former from a pulp bath, to have its sides upwardly and outwardly inclined at an angle to the horizontal, and the blank then removed, dried and folded to upright position with a given diameter base and the blank being of necessary filtering area, the folded portions will not be so excessive as to cause undue crowding. In other words, a flat blank of necessary filtering area will be so crowded in the folds at and near the perimeter at the top when folded about a given diameter base into upright position as to greatly lessen the filtering efficiency, whereas the same or greater filtering area without excessive crowding of the folds may be obtained in a blank having the same diameter base but with upwardly and outwardly inclined sides forming an angle with the horizontal, by controlling the length of the inclined sides, the angle of the sides with the horizontal, and the overall diameter of the blank. This is one of the important features of the present invention in producing a filter that is not of excessive diameter with relation to its height, as will now be described.

Figure 1:
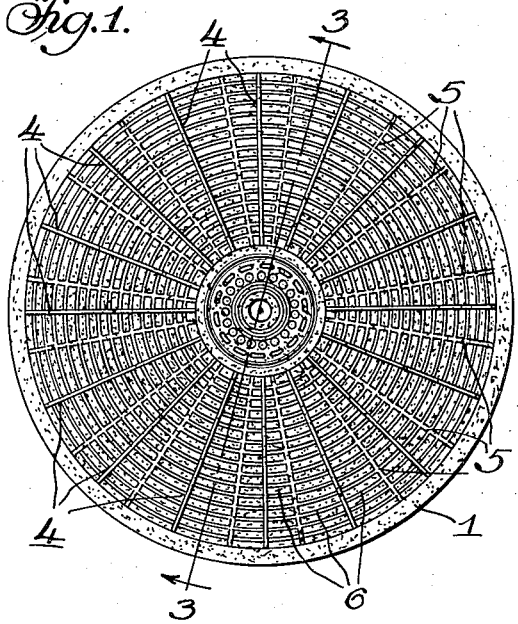
Figure 1 is a top plan view of an accreted fibrous pulp blank forming the outer shell of the filter member.
Figure 2:
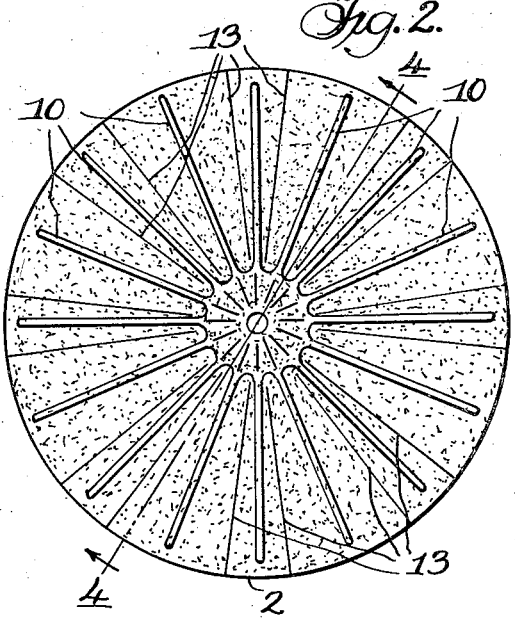
Fig. 2 is a top plan view of an accreted fibrous pulp blank forming the inner shell of the filter member.
Figures 3, 4:
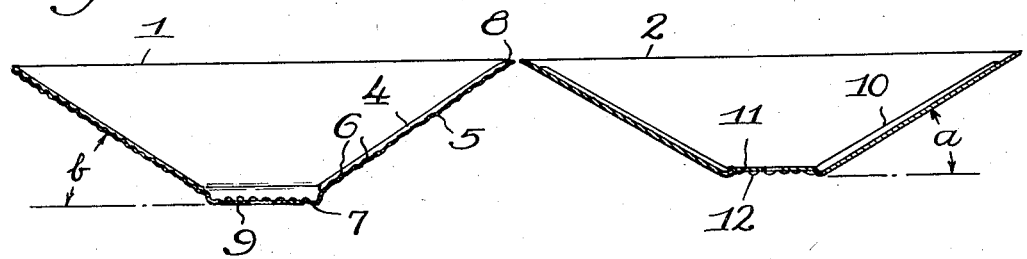
Fig. 3 is a vertical transverse section on the line 3—3 of Fig. 1.
Fig. 4 is a vertical transverse section on the line 4—4 of Fig. 2.
Figure 5:
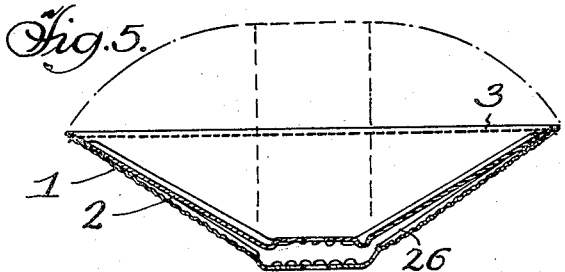
Fig. 5 is a vertical transverse section of the inner and outer shell nested together and stitched together at their upper edges and before being folded to bring their sides into substantially vertical position.

Fig. 3 shows in vertical section on the line 3—3 of Fig. 1 an accreted blank formed on a porous former by differential pressures in a fibrous pulp bath. The blank thus formed after being removed from the former and dried constitutes the outer shell of a filter embodying the present invention. Fig. 4 shows a blank similar to Fig. 3 except for slight differences in the diameter of the base and the arrangement of corrugations, it being pointed out that the overall height of the blank in Fig. 4 is less than that of the blank in Fig. 3, and the angle $a$ between the sides of the blank and the horizontal in Fig. 4 is less than the angle $b$ in Fig. 3. This difference in the diameters of the base, and the difference between the angles of the sides, prevents the material of the blanks from being forced together when folding the blanks to upright position. For convenience the blank in Fig. 3 is designated generally as 1 and the blank in Fig. 4 as 2. The inner blank 2 is placed within the outer blank 1 concentrically therewith, after which the perimeters of these two blanks are stitched, sewed or otherwise secured together as indicated at 3, resulting in a pair of spaced blanks having angular sides, and being nested together but somewhat spaced apart except at their perimeters as shown in Fig. 5. The outer blank or shell 1 is shown in top plan view in Fig. 1, the inner blank or shell 2 being shown in top plan view in Fig. 2.

While being accreted on the porous former in the fibrous pulp bath, the outer shell 1 is formed with radial inwardly protruding corrugations 4 and radially outwardly protruding corrugations 5. Extending between these inwardly and outwardly protruding corrugations are a considerable number of annular corrugations 6 extending from near the base 7 to the perimeter 8 as seen in Fig. 3. In the base 7 of blank 1 are formed additional projections 9 which may be circular or elongated as desired.

Figure 9:
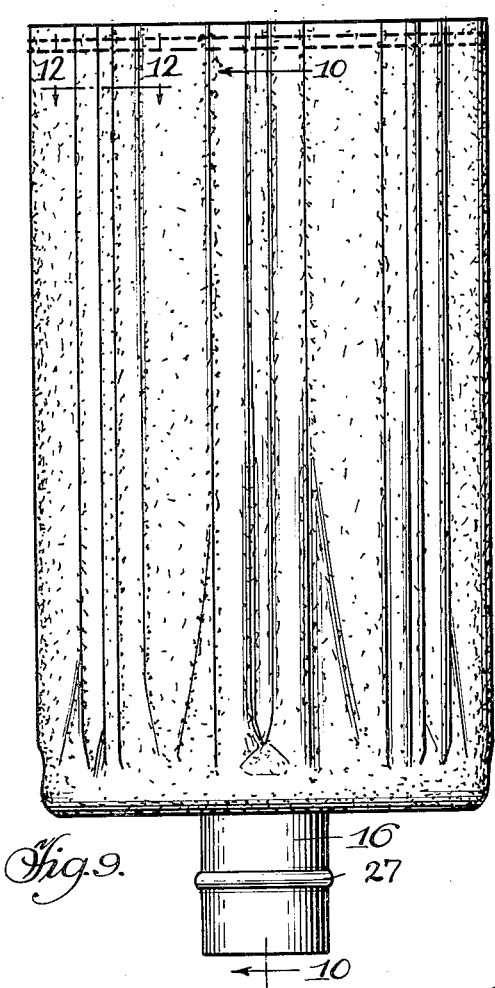
Fig. 9 is a side elevation of the filter element and outlet tube ready to be inserted into the filter casing.
Figure 10:
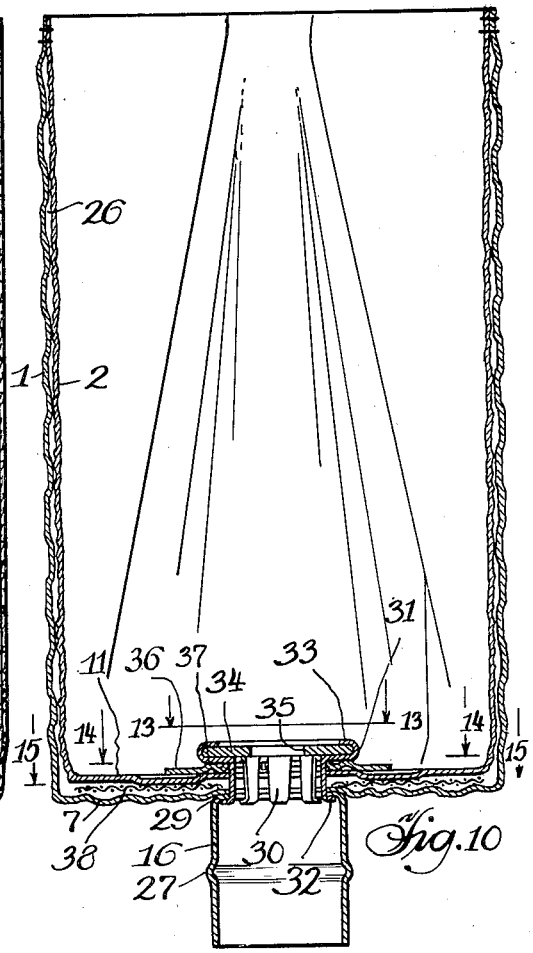
Fig. 10 is a vertical longitudinal section on the line 10—10 of Fig. 9.
Figure 11:
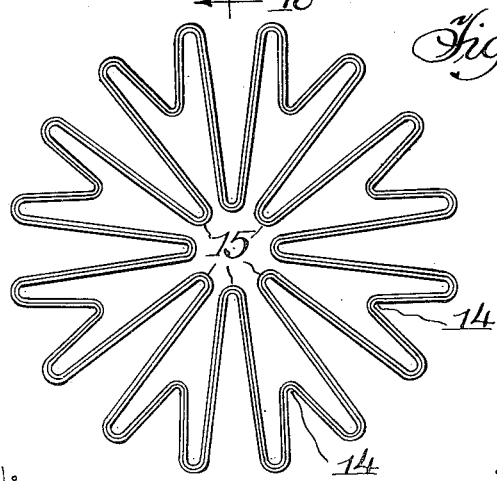
Fig. 11 is a top plan view of Fig. 9.

The inner blank 2 when being accreted on its porous former is formed with radial inwardly extending corrugations 10. The base 11 of the inner shell 2 is likewise formed with a number of downwardly extending projections or short corrugations 12. It is to be noted that when the inner shell 2 is placed within the outer shell 1 in the manner indicated in Fig. 5, the inwardly extending radial corrugations 10 will come directly opposite the inwardly extending radial corrugations 4 of the outer blank 1. Before nesting the blanks together the inner blank 2 is formed with fold lines 13 which are arranged radially and closer to one of the corrugations 10 than the other. This will be understood in Fig. 2 in which it will be seen that in each of the alternate corrugations the fold lines 13 are arranged closer thereto than in the next corrugation. In the outer blank, as seen in Fig. 1, the outwardly extending radial corrugations 5 serve as fold lines and are arranged with relation to the inwardly extending radial corrugations 4 in a manner similar to that just pointed out in connection with Fig. 2. This arrangement results in the corrugations and fold lines of the inner shell falling directly opposite to the similar lines in the outer shell so that the two shells when nested and having their perimeters secured together may be folded along these corrugations and fold lines to cause the material at the top of the folded, nested blanks to extend inwardly in folds after the manner shown in Fig. 11, which is a plan view looking down on the top of one of these folded pair of blanks. Fig. 9 shows a side elevation of this folded filter member, and Fig. 10 shows a vertical section of the same. Fig. 11 shows the reason for having the fold lines 13 nearer to alternate ones of the corrugations 10 in Fig. 2 and a similar arrangement of fold lines and corrugations in Fig. 1, namely, so that the alternate folds 14 will occupy a position further away from the center of the filter member than the inner edges of the other set of alternate folds 15. This arrangement of folds prevents excessive crowding of one fold against another, which might result in stopping off some of the filtering area and thus lessening the efficiency of the filter member as would occur if flat discs were thus folded instead of blanks with angular sides as shown in Fig. 5.

For illustrative purposes, Fig. 6 shows the sides c of a pair of nested blanks of greater angularity with relation to the horizontal than Fig. 5. In Fig. 6 the diameter of the base d will determine the general diameter of the filter member after it is folded to upright position. As will be understood, a filter member having a high vertical dimension may be formed without excessive folded portions if the angle with relation to the horizontal is made sufficiently large. Such illustration is shown in Fig. 7 in which the side e is at a large angle with relation to the horizontal, the diameter of the folded filter member being determined by the diameter f of the base. Fig. 8 shows an arrangement of radial corrugations and fold lines similar to those shown in Figs. 1 and 2, thus enabling the proper arrangement of folds as shown in Fig. 11 and described above. By having blanks of a given overall diameter g or approximately so, all that is necessary to increase the height of the filter members is to maintain such overall diameter constant or substantially so and vary the angle with the horizontal as shown in Figs. 6 and 7 without producing an excessive number of folds with interfering areas and resultant overcrowding and lessening of filtering efficiency.

Due to the inner and outer blanks being substantially conical before folding, the folded portions 14 and 15 will extend inwardly a maximum distance at the top after the filter member has been folded to upright position, and taper downwardly to near the outer portion of the filter member at the bottom as seen in Fig. 10. The inner and outer blanks being sewed or otherwise fixed together at the top as seen in Fig. 11, and the outlet tube 16 being fixed thereto at the bottom, as will be later more fully described, the filter member is then ready to be inserted into the filter casing 17, which is provided at its bottom end with a base 18 having an inlet opening 19 leading to the interior of the casing and an outlet opening 20 within which is screwed the clamping bolt 21 provided at its upper end with a head 22 to bear against the upper end 23 of the neck of the casing member, there being interposed between the neck 23 and head 22 a suitable gasket or bearing member 24. The base 18 is suitably apertured at 25 to form the outlet for filtered oil from the interior of the filter member, which filtered oil then flows outwardly through adjacent connections to the oil circulating system.

Referring again to Fig. 5, it will be seen that the inner shell and outer shell are each formed with an inclined side wall forming a different angle with relation to the horizontal from the other, the angle of the inner shell being less than that of the outer shell so that a space is formed between the two shells when they are nested together and their upper edges sewed together whereby, when the side walls are folded or bent upwardly to upright position, a sufficient space without undue crowding and jamming together of parts will be left therebetween and will permit a free and efficient folding upwardly of the side walls.

As will be understood, the blanks or shells from which our improved filter is made, being accreted onto a porous former from a fibrous pulp bath, will be filled with interstices and afford an ideal filtering medium for filtering oil and other fluids. The oil will pass upwardly through inlet 19 (Fig. 16) to the exterior of the filter member and then pass inwardly through the filter walls from both the outside of the filter member as well as from the hollow interior, shown in Fig. 10, so that the oil will pass through the interstices in the filter member to the space 26 between the walls, and thence outwardly through the bottom and through the outlet and continue on through the oil circulating system. Due to the corrugations 4, 5, 6, 9, 10 and 12, and also due to the rough nature of the adjacent walls of the filter member, the filtered oil after passing through the filter walls will readily find its way downwardly through the space 26 between the walls to the outlet of the filter casing. In other words, these walls either because of intentional corrugations, or controlled roughness of the surfaces, will when pressed back to back under pressure of the oil in the filter casing always have sufficient clearance or space therebetween to permit the oil to trickle and otherwise find its way to the outlet of the filter casing. These corrugations, roughened surfaces and the like will prevent any possibility of shutting off the flow of oil between these walls by reason of there not being sufficient space between the walls to receive or allow passage of the oil.

Referring now to the lower portion of Fig. 10, the outlet tube 16 is formed with the outwardly extending annular bead 27 which, as seen in Fig. 16, rests against the inclined shoulder 28. The upper end of outlet tube 16 is bent inwardly to form the flange 29, against the upper surface of which bears the lower surface of the base 7 of the outer shell 1, it being understood that a central opening is formed in each of the outer and inner shells to receive the spaced apart legs 30 of the sheet metal gasket retainer 31, the bottom ends of these spaced legs 30 being bent outwardly to form flanges 32 to fit below the annular flange 29 of the outlet tube 16. The upper end of the gasket retainer 31 is flanged inwardly at 33 to receive the composition washer 34, which washer is formed with a central circular opening 35 to snugly receive the tightening bolt 21 to prevent leakage therearound. Positioned beneath the outwardly extending annular portion of the gasket retainer 31 is a washer 36 having a metering orifice 36a, and formed at a plurality of spaced points are the upwardly extending spaced projections 37, against the upper portions of which projections rests the bottom of the outwardly extending upper portion of the gasket retainer 31. This meter orifice washer insures a flow of oil through the filter when the oil is congealed due to cold weather, thereby relieving the pressure on the filter element until the oil, after becoming heated in the motor and circulating inside the filter casing and out through the meter orifice washer, has brought the temperature of the filter element up to good working condition without undue pressure being imposed on said element. The size of the metering orifice 36a and the outlet orifice 25 is such as to allow only a small percentage of oil to pass therethrough, thereby preventing the possibility of robbing too much oil from the remainder of the oil supply system and always insuring an adequate amount for lubricating the bearings and other parts of the motor. Positioned in the space 26 between the base 11 of the inner shell and the base 7 of the outer shell is a metallic screen member 38, of which one or more may be used as desired. This screen member adds to the space 26 and prevents the adjacent faces of the base portions 7 and 11 from being pressed too tightly together.

It will thus be seen that when the filter member is placed within the filter casing 17 and the clamping bolt 21, screwed into place to tighten the parts together, and oil to be filtered introduced through inlet 19, the oil will pass through the porous walls of the outer shell 1 and inner shell 2, and find its way into the space 26, and thence downwardly and inwardly through the meshes of the screen 38, and then inwardly through the spaces between the spaced legs 30, and thence to the interior of the outlet tube 16, and then downwardly into the annular space 39 (see Fig. 16), and then out through the outlet orifice 25 to continue its course through the circulating system.

Preferably as seen in Fig. 16, the upper edge of the filter member will press against and be held solidly by the upper inwardly inclined portion 40 of the filter casing. Due to the folds, however, as will be clear, some of the unfiltered oil will pass to the interior of the inner shell of the filter member, a large portion of which will be filtered outwardly through the walls 2 of the inner shell to the space 26, and as stated, downwardly and inwardly to the outlet tube 16.

Figure 12:
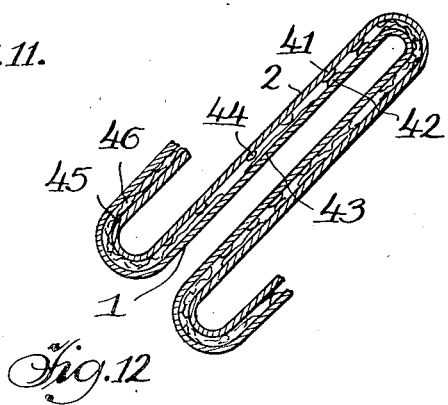
Fig. 12 is a fragmentary transverse section on the line 12—12 of Fig. 9.

As seen in Fig. 12, the inner wall 2 and the outer wall 1 will be normally spaced apart by reason of meeting corrugations 41, 42, 43 and 44, which may be the same corrugations shown in Figs. 1 to 4, or additional corrugations formed while accreting the blanks, these corrugations touching each other at various points, thus further insuring the formation of the space 26 between the filter walls. Also as shown in Fig. 12, the surfaces 45 and 46 of the inner and outer shells may be accreted and in such accreting operation control and form the spaces 26 to enable the flow of oil downwardly through this space to the outlet of the filter without the necessity of forming corrugations or ridges. These corrugations, ridges, roughened surfaces or the like thus enable the filter walls to be placed back to back and always insure a filtering space therebetween regardless of the pressure of the oil on both sides of the filter. It has been found in actual practice that by varying the amount in the differential of pressure used in accreting the fibrous blank, as well as changes in the consistency of the bath and degree of agitation used in keeping the fibers in the bath uniformly dispersed, that the surfaces can be made sufficiently rough and irregular so as to always insure the creation of the spaces 26.

As will be seen in Fig. 10, the shape of the blanks shown in Figs. 3 and 4 is such that the inner edges of the inwardly folded portions will extend on an incline outwardly toward the bottom of the filter. In other words, these folds will extend inwardly to their greatest extent of the top and then taper outwardly and downwardly to the bottom of the filter. This gives in effect a triangle shape for each of the folds. In Figs. 17 to 20, we have shown a modification in which a special form of blank is used to cause the inwardly folded portions to each substantially assume the shape of a rectangle instead of a triangle, thus affording a much greater filter area. As seen in Figs. 17 and 18, this is done by accreting the blank from a fibrous pulp bath onto a former that will produce the shape shown in these figures here under discussion. This blank instead of being substantially conical, like those in Figs. 1 to 4, is formed with inwardly extending hollow ribs 50, which start at the perimeter of the blank and extend inwardly at an increasing depth toward the circle of the base. These ribs are hollow as indicated at 51, and each alternate hollow rib is of less height than the preceding one in order to give the same effect as the folded blank shown in Fig. 11, to-wit, to enable each alternate rib to occupy a space further removed from the center than the preceding ribs in order not to have undue crowding together of the ribs when folded which might lessen the filtering efficiency as explained earlier herein. In this form of filter, as in the preceding forms, an inner shell will be accreted on one form at a smaller angle with the horizontal than the outer shell, and the outer shell accreted on a separate form at a greater angle with the horizontal. In other words, the same idea as to the different angularity of the inner shell and the outer shell applies in this modification as in the preceding forms. It is thus seen that an inner shell may be nested into an outer shell with the hollow portion of the ribs of the inner shell receiving the ribs of the outer shell, and when the two shells are thus snugly nested together and their perimeters sewed, stitched, stapled or otherwise fastened together, the blank will be folded up along fold lines similar to that described in connection with Figs. 1 and 2, to bring the sides into upright position with folds more or less similar to the folds in Fig. 11. The folded filter member is shown in cross-section in Fig. 20, the invention here being the same as in the preceding forms except as stated to give greater filtering area because of the folds assuming rectangular shape and extending full width substantially to the bottom of the filter member instead of being triangular and losing a great degree of filtering area. Fig. 19 is a fragmentary view to show the step of bending the side walls of the blank into upright position. The fact that the ribs 50 are higher at their inner ends than at their outer end, as will be readily understood, creates the rectangular shape referred to above and gives the greater filtering area. Otherwise in operation the filter of this modification functions the same as that in the preceding forms.

It will be readily apparent from the above description and the disclosure in the drawings that the novel invention comprehends an accurate control in the accreting of the fibrous filter blanks to produce on the desired surfaces a contour having a degree of roughness or irregularity that will insure under any and all operating conditions a continuous passage for the filtered fluid from between the filtering surfaces and leading to the discharge from the filter unit. Furthermore, the filtering unit so formed has a degree of stability that makes it self-supporting and requires no auxiliary supporting means. In order to give greater stability and/or longer life to the fibers, these fibers may be treated with any sizing or proofing composition suitable for the purpose.

It will thus be seen that we have provided a fibrous filter in which the proportions between the final diameter and the finished length may be controlled to give maximum free filtering area by so arranging and determining the overall diameter of the blank, the angle of the sides and the length of the sides, to give the desired amount of folded portions.

Figure 4A:
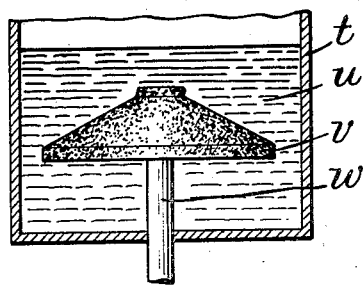
Fig. 4a is a diagrammatic section through a tank for holding a fibrous bath, the former being shown in elevation.

The accreting or felting steps will be readily understood to comprise the immersion of a porous former into a bath of fibrous pulp and depositing the fibers by accretion under a differential of pressure onto the former to produce a blank of greater or less thickness as desired and of the desired shape. For general illustrative purposes we have shown in Fig. 4a a tank $t$ containing a bath $u$ of any desired consistency and kind of fibers, which are accreted onto the former $v$ which is hollow, and porous on the face to receive the blank, and which former is movable in the bath by means of the pipe $w$ communicating with the interior of the former and any suitable source of suction. Pipe $w$ is slidable vertically in the bottom of the tank, or any other means for raising and lowering the former into and out of the bath may be employed as desired.

Having described our invention, we claim:

1. A fibrous filter member formed of accreted fibrous pulp, comprising separate inner and outer porous, interlaced, fibrous shells having contacting side walls, secured together at their free edges and having roughened surfaces on their adjacent faces to provide intercommunicating spaces therebetween, said member having a substantially rigid base provided with an outlet leading from the spaces between the shell to the outside, the upper portion of the filter member having around its circumference a substantial number of inwardly extending folds, some of said folds extending inwardly farther than others so that each alternate pair of inwardly extending portions extend a substantial distance inwardly and has therebetween a pair of inwardly extending portions extending a less distance inwardly, said shells being free of any supporting member between their side walls.

2. A fibrous filter member formed of accreted fibrous pulp, comprising separate inner and outer porous, interlaced, fibrous shells having contacting side walls, the adjacent faces of said side walls being rough so that when in contact with each other they are free of any supporting member between their side walls and provide intercommunicating spaces therebetween, said shells being secured together at their free edges and having at their opposite end an outlet in communication with said spaces, said shells having in their upper portion around their circumference spaced pairs of longer inwardly folded portions and between each alternate ones of said pair having a pair of shorter inwardly folded portions to provide a large filtering area so that the liquid being filtered will pass inwardly in opposite directions through the inner and outer shells into said intercommunicating spaces, then longitudinally between the adjacent faces of said shells to and through the outlet.

3. A fibrous filter member, comprising porous separate inner and outer shells accreted from a fibrous pulp bath, said member having one end of substantially circular formation, said shells being secured together at their free edges and free of any attachment between their meeting faces to form spaces therebetween, an outlet in said filter at a point removed from said free edges and communicating with said spaces between said faces, the secured free edges of the shells having two series of inwardly extending folds, the folds of one of said series extending inwardly farther than the folds of the other series, said folds also extending longitudinally of the filter member, said shells being free of any supporting member between their side walls, whereby the liquid being filtered will pass laterally through the shells and into the spaces therebetween and out through the outlet.

4. A porous fibrous filter member comprising separate inner and outer shells formed of accreted fibers and secured together at their free edges, said member having one end of substantially circular formation and formed with an outlet, the other end having two series of inwardly extending folds, the folds of one of said series extending inwardly farther than the folds of the other series, the longitudinal center lines of the outer edges of said folds being substantially parallel with each other, and the longitudinal center lines of the inner edges of said folds being inclined from one end to the other, said shells being unattached to each other except at their edges and free of any supporting member between their side walls.

5. A porous fibrous filter member comprising separate inner and outer shells formed of accreted fibers and secured together at their free edges, said member having one end of substantially circular formation and provided with an outlet, the other end having two series of inwardly extending longitudinal folds, the folds of one of said series extending radially inwardly farther than the folds of the other series, the surfaces between said inner and outer shells being provided with projections and depressions to form a continuously open space between the shells to receive and permit a flow of the filtrate therethrough after being filtered through the fibers of the shells, said shells being unattached except at their edges and free of any supporting member between their side walls.

6. The method of forming a fibrous filter member which consists in forming an inner preformed accreted fibrous shell having side walls with a given over-all diameter, a given diameter of base, and a given acute angle between the side walls and the horizontal, forming an outer preformed accreted fibrous shell having side walls with an over-all diameter substantially the same as that of the inner shell, and a base of slightly larger diameter than that of the inner shell, nesting the two shells together and securing their free edges together, the side walls of the outer shell being slightly longer and forming an acute angle with the horizontal slightly greater than that of the inner shell, then folding the angular sides of the two shells into upright position to form inwardly extending folds at the free end portions of the filter member.

7. The method of forming a fibrous filter member which consists in forming two preformed accreted fibrous conical shells of substantially the same over-all diameter and frusto-conical in shape, nesting the two shells together and securing their free edges together, the side walls of each forming a different angle with the horizontal, and bending the side walls into upright position and simultaneously folding portions of the side walls inwardly.

8. The method of forming a fibrous filter member which consists in forming two separate shells by accreting fibers onto a porous former in a pulp bath, each of said shells being substantially the same over-all diameter and frusto-conical in shape, the side walls of said shells forming different angles with the horizontal, placing the shell with the smaller angled side walls within the other shell, securing the perimeter of the side walls of the two shells together, bending the side walls into upright position, and simultaneously folding portions of the side walls inwardly.

9. The method of forming a fibrous filter member having inner and outer shells, which consists in accreting onto a porous former in a fibrous pulp bath a frusto-conical inner shell having a given over-all diameter, a given diameter base and its angular side walls forming a given angle with the horizontal, drying said inner shell, accreting onto a separate porous former in a fibrous pulp bath a frusto-conical outer shell having an over-all diameter substantially the same as that of the inner shell, a base diameter somewhat greater than that of the inner shell, and side walls forming a somewhat greater angle with the horizontal than the inner shell, drying the outer shell, placing the inner shell within the outer shell with their perimeters in registry, securing said perimeters together, then bending the side walls of the inner and outer shells into upright position and simultaneously folding portions of the side walls inwardly.

10. An accreted fibrous pulp filter member comprising inner and outer walls with filtrate receiving spaces therebetween, spaced base members at the bottom of the filter member, and inwardly extending hollow ribs in said walls, an outlet communicating with said filtrate receiving spaces, said ribs of one wall being nested into the ribs of the other wall so that filtrate may pass through each of the inner and outer walls and into and through the space between the walls and out through the outlet.

11. An accreted fibrous pulp filter member comprising inner and outer walls with filtrate receiving spaces therebetween, spaced base members at the bottom of the filter member, and inwardly extending hollow ribs in said walls, said ribs of one wall being nested into the ribs of the other wall so that filtrate may pass through each of the inner and outer walls and into and through the space between the walls, said ribs being of substantially constant width from the top to near the bottom of the filter member, and an outlet in said filter member communicating with said filtrate receiving spaces.

12. An accreted fibrous pulp filter member comprising inner and outer walls with filtrate receiving spaces therebetween, spaced base members at the bottom of the filter member, an outlet communicating with said filtrate receiving spaces, and inwardly extending hollow ribs in said walls, said ribs of one wall being nested into the ribs of the other wall so that filtrate may pass through each of the inner and outer walls and into and through the space between the walls and out through the outlet, said ribs being of substantially constant width from the top to near the bottom of the filter member, the alternate ribs being of greater width than the others.

13. The method of making fibrous filter members which consists in accreting onto a former in a fibrous pulp bath a frusto-conical inner shell having upstanding hollow ribs, removing the shell from the former, drying the shell, accreting onto a separate former in a fibrous pulp bath a frusto-conical outer shell having upstanding hollow ribs, removing the last mentioned shell from its former, drying the last mentioned shell, placing the inner shell within the outer shell with the ribs of the outer shell extending into the hollow ribs of the inner shell, securing together the perimeters of the two shells, and bending the inclined sides upwardly to form a cylinder with inwardly extending folds of substantially constant widths throughout their lengths.

14. The method of making a fibrous filter member which consists in accreting a pair of separate frusto-conical blanks in a fibrous pulp and forming the side walls of the two blanks to have different angles with the horizontal, drying said blanks and then nesting them, securing their perimeters together, and then folding the side walls upwardly into substantially cylindrical position and simultaneously folding the side walls inwardly to form longitudinally extending folds.

EDWARD C. SLOAN.
AUGUSTUS H. EBERMAN.